United States Patent
Yamada et al.

(10) Patent No.: US 6,500,893 B2
(45) Date of Patent: Dec. 31, 2002

(54) RESIN COMPOSITION

(75) Inventors: Hitoshi Yamada, Shizuoka (JP); Kazuki Morimoto, Shizuoka (JP); Katsuya Kusuno, Shizuoka (JP); Shuichiro Wada, Shizuoka (JP); Kazuo Nishimoto, Shizuoka (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 09/505,369

(22) Filed: Feb. 16, 2000

(65) Prior Publication Data

US 2002/0107318 A1 Aug. 8, 2002

(30) Foreign Application Priority Data

Feb. 16, 1999 (JP) .............................. 11-037431
Feb. 19, 1999 (JP) .............................. 11-042021

(51) Int. Cl.$^7$ ................................. C08K 3/04
(52) U.S. Cl. ........................ 524/495; 524/496
(58) Field of Search ................. 524/495, 496

(56) References Cited

U.S. PATENT DOCUMENTS

| | | | | |
|---|---|---|---|---|
| 4,042,346 A | * | 8/1977 | Sioui | 51/298 |
| 4,364,991 A | * | 12/1982 | Byrd | 524/137 |
| 4,861,643 A | * | 8/1989 | Scollard | 428/162 |
| 4,966,729 A | * | 10/1990 | Carmona | 252/511 |
| 6,215,194 B1 | * | 4/2001 | Nakabayashi | 257/782 |

FOREIGN PATENT DOCUMENTS

| | | |
|---|---|---|
| EP | 0 745 571 | 12/1996 |
| EP | 0 928 825 | 7/1999 |
| EP | 0 935 303 | 8/1999 |
| EP | 1 011 164 | 6/2000 |
| WO | WO99/05737 | 4/1999 |

OTHER PUBLICATIONS

Database WPI Section Ch, Week 198810 Derwent Class A81, AN 1988–068468, XP002179490.
Database WPI Section CH, Week 198740 Derwent Class A25, AN 1987–280745, XP002179491.

* cited by examiner

Primary Examiner—Edward J. Cain
(74) Attorney, Agent, or Firm—Nixon & Vanderhye P.C.

(57) ABSTRACT

The present invention provides a resin composition which can contain a large amount of a filler, has excellent moldability, can provide a molded product having both high electrical conductivity and mechanical strength, and is especially useful for a fuel cell separator and a sealing material. The resin composition comprises A) 100 parts by weight of a resin composed of 0 to 99 parts by weight of an epoxy resin and 1 to 100 parts by weight of a polyimide resin, with the proviso that the total amount of the epoxy resin and the polyimide resin is 100 parts by weight, and B) 40 to 900 parts by weight of at least one filler selected from the group consisting of graphite, ketjen black, acetylene black, furnace carbon black and thermal carbon black.

3 Claims, 2 Drawing Sheets

RESIN COMPOSITION

FIELD OF THE INVENTION

This invention relates to a resin composition, and a fuel cell separator and sealing material each comprising the resin composition.

BACKGROUND OF THE INVENTION

In recent years, there is an increasing demand for a fuel cell capable of directly changing the chemical energy of a fuel to electric energy.

A fuel cell is generally formed of a plurality of unit cells stacked one after another and each unit cell has electrode plates having an electrolyte-containing matrix sandwiched therebetween and a separator disposed outside the electrodes. Since a fuel is usually supplied to one side of the separator, while an oxidizing gas or the like is supplied to the other side, the separator is required to have excellent impermeability to gases so as to prevent mixing of these two substances. In addition, the separator is required to have high electrical conductivity and at the same time has excellent strength, because the fuel cell is composed of stacked unit cells.

As a fuel cell separator, conventionally employed is a molded product obtained by press molding a graphite sheet, a resin-impregnated material comprising a carbon sintered body impregnated with a resin, a glassy carbon available by sintering a thermosetting resin in an inert atmosphere, or a resin molded product obtained by molding a mixture of carbon powders and a resin.

For example, disclosed in JP-A-58-53167, JP-A-60-37670, JP-A-60-246568, JP-B-64-340, JP-B-6-22136 or WO97/02612 (the terms "JP-A" and JP-B" as used herein mean an unexamined Japanese patent application and an examined published Japanese patent publication, respectively) is a separator composed of a thermosetting resin such as phenol resin, graphite and carbon; in JP-B-57-42157 a bipolar separator composed of a thermosetting resin such as epoxy resin and an electrically conductive substance such as graphite; in JP-A-1-311570 a separator obtained by incorporating expanded graphite and carbon black in a thermosetting resin such as phenol resin or furan resin; and in JP-A-8-259767 an electrically conductive plastic plate obtained by incorporating carbon black in an ethylene-ethyl acetate copolymer or the like.

In JP-A-8-31231, disclosed is a molded product obtained by incorporating ketjen black and spherical graphite in a thermoplastic or thermosetting resin and as the resin, an aromatic polyimide or the like is described.

Fillers such as graphite and carbon black can also be used as raw materials for a sealing material. For example, the filling of a polymer such as rubber with carbon black improves the swelling degree of the polymer in a solvent and at the same time, imparts it with properties such as strength and abrasion resistance. Graphite, alone or as a composite with a polymer, is used as a sealing material such as packing or gasket because of its excellent sliding properties and fitness to the surface of the flange.

When a resin-impregnated material is used as a fuel cell separator, cutting is required in order to form a channel (groove) for the circulation of a fuel gas or the like, which inevitably increases the labor and cost upon manufacture. Although the use of glassy carbon permits molding into a product shape before sintering, a problem in dimensional stability such as dimensional shrinkage occurs upon sintering. A resin molded product is, on the other hand, accompanied with such a merit as easy molding, but is inferior in electrical conductivity because of electrical insulation properties of the resin. Filling of a large amount of a filler such as carbon powder in the resin in order to improve electrical conductivity however makes it difficult or impossible to mold or form the resulting resin.

Filling of a large amount of a filler brings about various advantages to a sealing material. For example, gas permeation resistance can be improved by filling a large amount of carbon black in a rubber. Particularly, in a graphite type sealing material, it is desired to heighten the mixing ratio of graphite as much as possible to attain high sliding properties and surface fitness.

Filling of a large amount of a filler, however, causes problems such as deterioration in moldability.

SUMMARY OF THE INVENTION

An object of the invention is to provide a resin composition which can contain a large amount of a filler, has excellent moldability and can provide a molded product having both high electrical conductivity and mechanical strength; and a fuel cell separator and a sealing material prepared by molding the above-described resin composition.

The present invention provides a resin composition comprising A) 100 parts by weight of a resin composed of 0 to 99 parts by weight of an epoxy resin and 1 to 100 parts by weight of a polyimide resin, with the proviso that the total amount of the epoxy resin and the polyimide resin is 100 parts by weight, and B) 40 to 900 parts by weight of at least one filler selected from the group consisting of graphite, ketjen black, acetylene black, furnace carbon black and thermal carbon black.

DETAILED DESCRIPTION OF THE INVENTION

Figure 1:
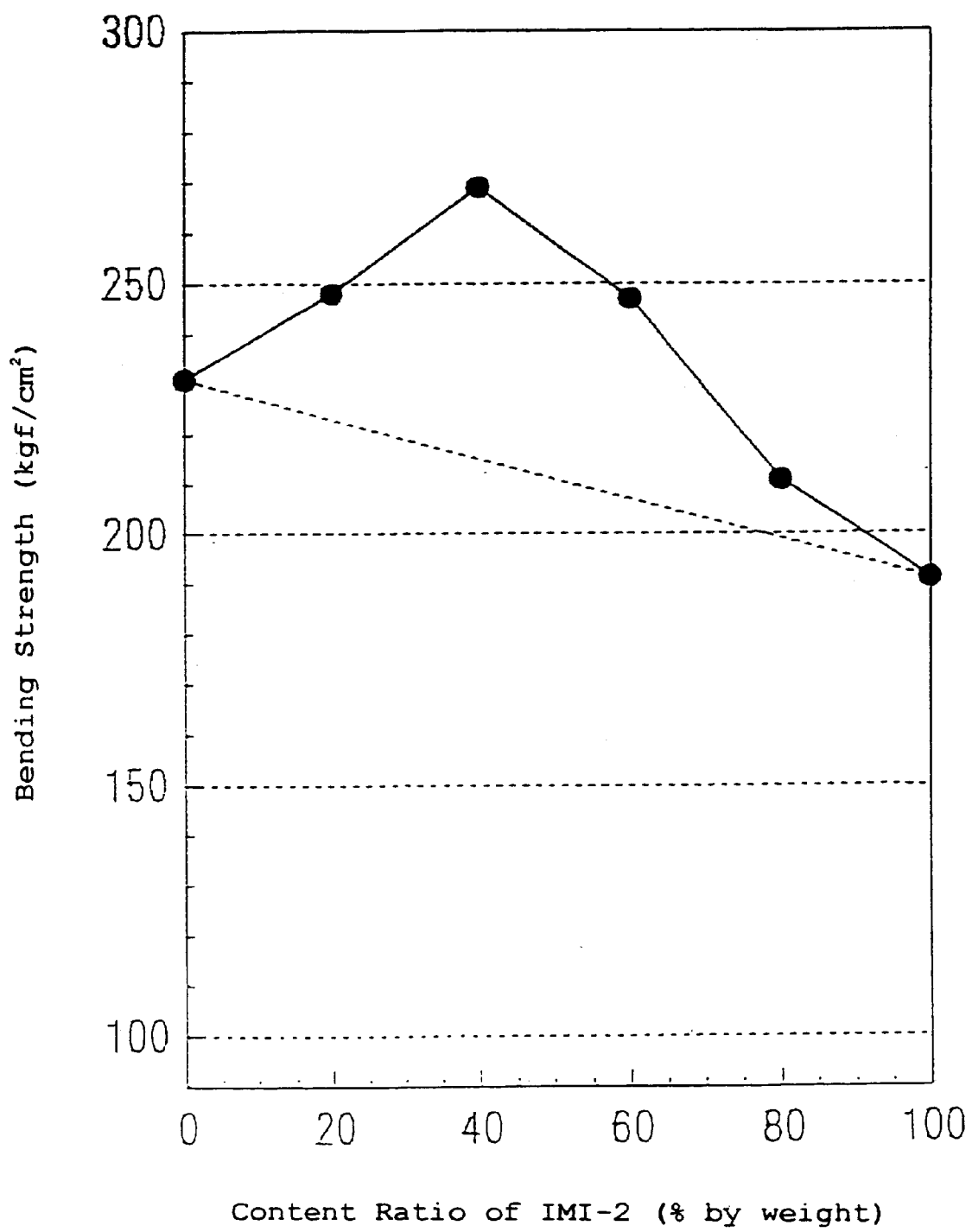
FIG. 1 is a graph in which results of the bending test in Examples 1b to 4b and Comparative Examples 1b and 2b are plotted versus the weight percentage of the polyimide resin in the resin composition.

The present invention will hereinafter be described more specifically.

The present inventors have investigated a resin to be used for forming a composite with a filler such as carbon powder. As a result, it has been found that use of a polyimide resin or a combination of an epoxy resin and a polyimide resin makes it possible to provide a resin composition which can be easily molded in spite of an increased content of the filler and the thus molded product has sufficiently high electrical conductivity and mechanical strength as a cell fuel separator or has sufficiently high sliding properties and surface fitness as a sealing material, leading to the completion of the present invention.

As a preferred embodiment, the present invention provides a first resin composition comprising 100 parts by weight of a polyimide resin and 40 to 900 parts by weight of at least one filler selected from the group consisting of graphite, ketjen black, acetylene black, furnace carbon black and thermal carbon black, and a fuel cell separator and a sealing material each prepared by molding the first resin composition.

Use of a polyimide as a resin component is an important requirement for the first resin composition. As described later in Examples, when the other polymers are used, a composite material equipped with high electrical conductivity, high strength and easy molding cannot be obtained. For example, the electrical conductivity of the composite material is not always improved by the use of a polymer having a smaller electric resistance than the polyimide. Although the polyimide resin is a polymer ordinarily employed as an insulator, the resin composition of the present invention containing it has acquired good electrical conductivity and is excellent in physical properties such as strength. Even at high temperatures, this resin composition exhibits high strength. The resin composition according to the present invention has thus brought about unexpected merits.

Furthermore, as another preferred embodiment, the present invention provides a second resin composition which comprises A) 100 parts by weight of a resin composed of 5 to 99 parts by weight of an epoxy resin and 95 to 1 part by weight of a polyimide resin, with the proviso that the total amount of the epoxy resin and the polyimide resin is 100 parts by weight, and B) 40 to 900 parts by weight of at least one filler selected from the group consisting of graphite, ketjen black, acetylene black, furnace carbon black and thermal carbon black, and a fuel cell separator and a sealing material each prepared by molding the second resin composition.

Use of an epoxy resin and a polyimide resin in combination as a resin component is an important requirement for the second resin composition. As described later in Examples, when a resin composition composed only of an epoxy resin or composed of any other polymer as a base polymer, the resulting molded product has insufficient strength at high temperatures. The second resin composition of the present invention comprising as a base polymer a mixture of an epoxy resin and a polyimide resin, on the other hand, provides a molded product having both good electrical conductivity and mechanical strength (particularly excellent in strength at high temperatures). Some mixtures permit the exhibition of higher strength or molding under milder conditions, compared with a resin composition comprising as a base only a polyimide resin. Although the epoxy or polyimide resin is a polymer ordinarily employed as an insulator, the resin composition of the present invention containing it or them has acquired good electrical conductivity. In consideration that even use of a polymer having smaller electric resistance than the epoxy or polyimide resin does not bring about an improvement in the electrical conductivity of the resulting composite material, such a merit as described above is utterly beyond expectation.

According to the present invention, resin compositions which can be easily prepared and molded and are excellent in strength and electrical conductivity, and a fuel cell separator and a sealing material composed of the resin composition are provided.

As a polyimide resin, those known to date can be used for the resin composition of the present invention. The term "polyimide resin" as used herein embraces all the polymers having in the molecule thereof an imide group ((—CO—)$_2$N—). Examples include, but not limited thereto, thermoplastic polyimides such as polyamide-imide and polyether imide, non-thermoplastic polyimides such as aromatic polyimides, thermosetting polyimides such as bismaleimide type polyimide, nadic acid type polyimides such as allylnadiimide and acetylene type polyimides. A plurality of the above-exemplified polyimides can be used in combination.

For example, an aromatic polyimide as described in JP-A-4-282565 or JP-A-8-31231, particularly a polyimide as described in JP-A-6-145639 or JP-A-8-73832 available by polycondensation of α,ω-alkylenebis(trimellitic dianhydride) with diamine may be used; or a polyamide-imide (thermoplastic polyimide) as described in JP-A-4-145197 can also be used.

In the present invention, however, thermosetting polyimides are preferably employed. They are accompanied with such an advantage as easier processing compared with thermoplastic polyimides or non-thermoplastic (aromatic) polyimides. Although their high-temperature properties are inferior to those of non-thermoplastic polyimides, they are markedly good among various organic polymers. In addition, they hardly generate voids and cracks upon curing so that they are suited as a component of the resin composition of the present invention.

The thermosetting polyimides can each be obtained, for example, by subjecting a low-molecular-weight monomer or oligomer, which has at its terminal an unsaturated group, used as a prepolymer to addition reaction, condensation or radical reaction, thereby three-dimensionally crosslinking it. Alternatively, a condensed type polyimide (water is released) as described in JP-B-2-213052 can be used. The present invention also embraces the polyimide resin in the form of the above-described prepolymer.

In a more preferred embodiment of the present invention, an addition type thermosetting-polyimide, for example, allylnadic imide type, maleimide type, triazine type or Michael addition type polyimide is employed. Since the curing of the addition type polyimide proceeds by the addition reaction of an unsaturated group in the prepolymer (low-molecular-weight monomer or oligomer), neither condensation water nor volatile substances are formed upon curing, which makes it possible to provide a composition free from air bubbles or cracks.

The prepolymer of the addition type polyimide is available, for example, by reacting allylnadic anhydride with diamine (hexamethylenediamine, bis(4-aminophenyl) methane or m-xylylenediamine), allylnadic anhydride with hydroxyphenylamine or allylamine, maleic anhydride with diamine (e.g., diaminodiphenylmethane), or vinylbenzyl compound with maleimide. The prepolymer is commercially available under the trade mark of "BANI" from Maruzen Petrochemical Co. Ltd., or "Imidaloy (KIR)" from Toshiba Chemical Corporation. Among them, the bismaleimide type polyimide is particularly preferred, because it generally cures promptly and therefore does not require severe conditions upon molding.

As an epoxy resin to be used for the resin composition of the present invention, any known epoxy resin can be used. The term "epoxy resin" as used herein embraces any composition formed by the reaction between a polyfunctional epoxy compound and a curing agent and also any epoxy compound and curing agent which provide the composition. The epoxy compound before reaction and composition formed by the reaction may hereinafter be called "epoxy resin precursor" and "cured epoxy product", respectively. The amount of the epoxy resin in the composition of the present invention is equal to the weight of the cured epoxy product.

As the epoxy resin precursor, various known compounds are usable. Examples include, but not limited to, bifunctional epoxy compounds such as bisphenol A diglycidyl ether type, bisphenol F diglycidyl ether type, bisphenol S diglycidyl ether type, bisphenol AD diglycidyl ether type and resorcinol diglycidyl ether type, polyfunctional epoxy compounds such as phenol novolak type and cresol novolak type, linear aliphatic epoxy compounds such as epoxylated soybean oil, cyclic aliphatic epoxy compounds, heterocyclic epoxy compounds, glycidyl ester type epoxy compounds and glycidylamine type epoxy compounds. Compounds having a substituent such as halogen or having a hydrogenated aromatic ring can also be used. Although no particular limitation is imposed on the epoxy equivalent, molecular weight and number of epoxy groups of the epoxy resin precursor, use of an epoxy compound having an epoxy equivalent of at least about 400, particularly, at least about 700 mainly as an epoxy resin precursor makes it possible to extend a pot life. Since the above-exemplified compounds are in the solid form at normal temperature, they can be handled easily upon powder molding. It is also possible to use a plurality of epoxy compounds in combination. For example, an epoxy resin precursor which has an epoxy equivalent of about 200 and can provide a cured product having a high net density is incorporated in another precursor having an epoxy equivalent of about 900 and a long pot life and the resulting mixture can be handled as powder or a liquid substance having a little longer pot life.

Such epoxy resin precursors form a cured epoxy product by reacting with a curing agent.

As the curing agent, various known compounds can be used. Examples include, but not limited to, aliphatic, alicyclic or aromatic polyamines such as diethylenetriamine, triethylenetetramine, tetraethylenepentamine, menthenediamine, isophoronediamine, N-aminoethylpiperazine, m-xylenediamine and diaminodiphenylmethane and carbonates thereof; acid anhydrides such as phthalic anhydride, methyltetrahydro phthalic anhydride, methylhexahydro phthalic anhydride, methylnadic anhydride, dodecylsuccinic anhydride, pyromellitic anhydride, benzophenonetetracarboxylic anhydride, trimellitic anhydride and polyazelaic anhydride; polyphenols such as phenol novolak; polymercaptane; anionic polymerization catalysts such as tris(dimethylaminomethyl)phenol, imidazole and ethyl methyl imidazole; cationic polymerization catalysts such as BF, and complexes thereof; and latent curing agents which pyrolytically or photolytically forming the above-described compounds. It is also possible to use a plurality of curing agents in combination. Among them, curing agents such as polyamines, carbonates thereof, acid anhydrides, polyphenols and polymercaptane undergo polyaddition reaction with an epoxy compound, thereby forming the corresponding cured epoxy product. They are called "polyaddition type curing agents". Since whether an unreacted functional group remains or not depends on the amount of the polyaddition type curing agent, so that there exists an appropriate amount range for the curing agent. It is usually preferred to use 0.7 to 1.2 equivalents, particularly 0.8 to 1.1 equivalents of a polyaddition type curing agent per epoxy group of the epoxy resin precursor. On the other hand, anionic polymerization catalysts and cationic polymerization catalysts act as an addition polymerization catalyst of an epoxy group and they are not incorporated in the cured structure. Accordingly, there does not exist an appropriate amount range and the amount can be determined according to the reaction rate. Such a catalyst is called "catalyst type curing agent" or "addition type curing agent". Incidentally, as described above, the amount of the epoxy resin means the weight of the cured epoxy product in the composition of the present invention and it is equal to the total weight of the epoxy resin precursor and polyaddition type curing agent used. The curing rate of the epoxy resin can be changed as desired by selecting the nature or amount of the curing agent or nature of the epoxy resin precursor. For those skilled in the art, it will be easy to determine the kind or amount of the precursor or curing agent according to the desired curing conditions.

In the resin composition of the present invention, the resin of component A) is composed of 0 to 99 parts by weight of an epoxy resin and 1 to 100 parts by weight of a polyimide resin, preferably 5 to 99 parts by weight of the above-described epoxy resin and 95 to 1 part by weight of the above-described polyimide resin, with the proviso that the total amount of the epoxy resin and the polyimide resin is 100 parts by weight. This means that the amount of the epoxy resin is 5 to 99% by weight and the amount of the polyimide resin is 1 to 95% by weight each based on the total amount of the epoxy resin and polyimide resin. Outside these ranges, the use of both resins in combination does not bring about a large merit. The ratio by weight of the epoxy resin : the polyimide resin is preferably from 97:3 to 30:70, more preferably from 95:5 to 50:50, most preferably from 90:10 to 60:40.

The resin composition of the present invention contains, as another essential ingredient, at least one filler selected from the group consisting of graphite, ketjen black, acetylene black, furnace carbon black and thermal carbon black. By the use of such a carbon type electrically conductive filler, the composition has heightened corrosion resistance and moreover, side reactions can be prevented when it is used as a fuel cell separator or sealing material.

Among those fillers, ketjen black and acetylene black are developed as an electrically conductive filler and can be obtained by incomplete combustion of a natural gas and pyrolysis of acetylene, respectively. Furnace carbon black can be obtained by incomplete combustion of a hydrogenated oil or natural gas and is classified into SAF, ISAF, IISAF, HAF, FF, FEF, MAF, GPF, SRF, CF and the like by particle size. Thermal carbon black is large-particle-size carbon obtained by pyrolysis of a natural gas and examples include FT carbon and MT carbon.

In the present invention, any one of these fillers can be used. Although it is also possible to use a plurality of fillers in combination, use of graphite or ketjen black, particularly, graphite is preferred.

There is no particular limitation imposed on the nature of the graphite and any form of graphite such as granular graphite, flaky graphite, expanded graphite and colloidal graphite can be used. Graphite fluoride or graphite interlayer compound obtained by intercalation of a metal atom, halogen atom, halogenated compound or the like can also be used. The term "expanded graphite" as used herein means graphite having graphite crystals subjected to laminar expansion and the expanded graphite is markedly bulky. Expanded graphite having a bulk density of about 0.3 or less, more preferably about 0.1 or less and particularly preferably about 0.05 or less is preferably employed. Use of such expanded graphite improves electrical conductivity and lubricating properties. Among the above-exemplified graphite, expanded graphite, flaky graphite, particularly granular graphite, is preferred.

The filler is added in an amount of 40 to 900 parts by weight based on 100 parts by weight of the resin as component A). When the amount of the filler is less than 40 parts by weight, the sufficient electrical conductivity cannot be attained, while the amounts exceeding 900 parts by weight cause a problem in strength or molding. In consideration of these points, the filler is more preferably added in an amount of 60 to 800 parts by weight, still more preferably 100 to 600 parts by weight, particularly preferably 150 to 400 parts by weight.

Addition of fibers as component C) to the resin composition of the present invention can reinforce the molded product available therefrom.

For example, addition of carbon fibers or glass fibers in an amount of 1 to 100 parts by weight, particularly 10 to 50 parts by weight per 100 parts by weight of the resin of the-component A) can improve the strength, particularly, impact resistance of the molded product obtained from the resulting resin composition. There is no particular limitation imposed on the nature of the carbon fibers or glass fibers and various known fibers can be used. It is also possible to use fibers such as cotton, wool, silk, hemp, nylon, Aramid, Vinylon (polyvinyl alcohol), polyester, rayon, acetate, phenol-formaldehyde, polyphenylene sulfide, acrylic, polyvinyl chloride, polyvinylidene chloride, polyurethane or tetrafluoroethylene fibers. Among them, carbon fibers, particularly, PAN type carbon fibers and pitch type carbon fibers are preferred in the present invention. The addition of such fibers makes it possible to improve the strength of the resulting resin composition without substantially impairing the electrical conductivity.

Although no particular limitation is imposed on the form of fibers, fibers having a length within a range of about 0.01 to 100 mm, particularly about 0.1 to 20 mm are preferably used. The fibers having a fiber length exceeding 100 mm make it difficult to mold or form the resulting resin composition and to flatten the surface of the molded product, while at a fiber length shorter than 0.01 mm, reinforcement effects of fibers cannot be expected.

Where the resin A), filler B) and fiber C) are added in combination, the amount of each component can be preferably selected such that the amount falls within the area surrounded by four straight lines, in a triangular coordinate (unit: wt %), represented by the following equations:

$A=10-0.1\times C,$ $B=28-0.3\times C,$ $C=0.4\times (A+B),$ and $C=0,$ more preferably, the area surrounded by four straight lines represented by the following equations:

$A=15-0.2\times C,$ $B=50-0.5\times C,$ $C=0.3\times (A+B),$ and $C=0.03\times (A+B).$ The resin composition of the present invention generally contains the resin A), filler B) and fiber C) in an amount of from 10 to 70% by weight, from 40 to 90% by weight, and from 0 to 40% by weight, respectively, based on the total amount of the resin composition.

The resin composition of the present invention can be prepared in a conventional manner, for example, by heating and melting a polyimide resin, or both an epoxy resin and a polyimide resin, or prepolymers thereof or dissolving them in a solvent, and then adding a filler or the like to the resulting molten mixture or solution. Alternatively, polyimide (prepolymer) powder or epoxy and polyimide (prepolymer) powder and a filler are kneaded simultaneously.

The resin composition of the present invention thus obtained can be molded into various forms by conventional means. Molding can be effected, for example, by directly polymerizing prepolymers of the epoxy and polyimide resins into a predetermined shape in the presence of a filler; in the case of a thermoplastic polyimide, by using the molding method ordinarily employed in the field of a thermoplastic resin such as injection molding, extrusion, transfer molding, blow molding, press molding, injection press molding or extrusion-injection forming; or in the case of a thermosetting polyimide, by pressing under heat at an appropriate temperature for an appropriate time determined depending on the nature of the raw material. Curing by exposure to radiation, electron beams or ultraviolet rays can also be adopted. It is possible to use the above-exemplified molding methods in combination. For example, a thermoplastic-polyimide-base molded product obtained by injection molding or extrusion can be adhered under a molten state with a thermosetting-polyimide-base molded product; or a sheet obtained by extrusion can be molded into a final product having complex irregularities by pressing or the like. The molding temperature of the thermoplastic polyimide is generally from 250 to 400° C. and that of the thermosetting temperature is generally from 150 to 400° C. In the present invention, the molding temperature is preferably from 150 to 300° C., more preferably from 170 to 250° C. The molded product can be subjected to secondary crosslinking by using a heating oven or by exposure to electron beams. It will be easy for those skilled in the art to select the preferable molding method and conditions, depending on the application or the form of the product.

In the present invention, it is preferred to use a thermosetting polyimide as a polyimide resin and to select an epoxy resin and a polyimide resin having the same curing rate, which can be attained by selecting an appropriate molding temperature, nature of an epoxy resin precursor, or kind and amount of an epoxy curing agent.

Curing conditions of the thermosetting polyimide resin can be changed by adding thereto a specific compound. For example, the curing temperature or curing time can be reduced by adding, to 100 parts by weight of the polyimide resin, about 0.1 to 5 parts by weight of a compound such as p-toluenesulfonic acid, p-xylenesulfonic acid, methyl toluenesulfonate, pyridinium p-toluenesulfonate, pyridinium m-nitrobenzenesulfonate, methylhydrazinium sulfate or the like.

When the content of the polyimide resin in the resin of the component A) is small, for example, about 5 to 40 wt. %, particularly about 5 to 20 wt. %, it is possible to cure only the epoxy resin by pressing under conditions hardly permitting curing of the polyimide resin, for example, at about 150 to 180° C. and after that, to crosslink the polyimide component in an oven, which makes it possible to carry out pressing works safely with an increased working efficiency and in addition, to carry out crosslinking in an oven at a temperature higher than the highest temperature which a press can provide.

In the resin composition of the present invention, various additives can be incorporated optionally. Examples of such an additive include polymers other than those described above, such as PET, PBT, polyester-base thermoplastic elastomer, low-molecular-weight polyester, polyamide, nitrile rubber and acrylic rubber, fillers other than those described above, such as silica, calcium carbonate, barium sulfate and clay minerals, pigments, dispersants such as diethylene glycol monostearate, monoethanolamine, diethylene glycol and pine tar, antioxidants such as phenol base and amine base ones, coupling agent such as aminopropyltriethoxysilane, phenylaminopropyltrimethoxysilane, ureidopropyltriethoxysilane, glycidoxypropyltrimethoxysilane, isocyanatopropyltriethoxysilane, isopropyltriisostearoyl titanate, isopropyltridecylbenzenesulfonyl titanate, acetoalkoxyaluminum diisopropylate, compatibilizers, flame retardants, surface smootheners, fatty acids, stearic acid, esters thereof, plasticizers such as phthalates, plastic powders and processing assistants. Among them, the addition of an elastomer component is particularly advantageous when impact resistance is required.

The resin composition of the present invention is excellent in electrical conductivity, heat conductivity and strength, and particularly has the advantage of providing a molded article having high strength at high temperatures. Furthermore, the resin composition of the present invention is excellent in heat resistance, solvent resistance, gas impermeability, etc. When an addition type thermosetting polyimide resin is employed, molding can be carried out easily without a solvent (a solvent can be used if desired).

The resin composition of the present invention is useful as a material for sealing materials having various shapes, since it is excellent in strength, heat resistance, solvent resistance and gas impermeability. The excellent electrical conductivity of the resin composition enables the considerable reduction in electrification on the sealing surface, handling difficulty attributable to the electrification, adhesion of contaminants, and danger such as fire. Particularly, where graphite, especially expanded graphite or flaky graphite, is used as the filler, the resulting molded article is excellent in not only electrical conductivity but also suitability to the surface to be sealed and sliding properties, so it is useful as a sealing material for piping, vacuum apparatus, valve, bearing, etc., particularly a packing for a rotating apparatus. Furthermore, the resin composition containing an addition type thermosetting polyimide resin as a polyimide resin has easiness in molding, and can therefore provide sealing materials having high heat resistance and various complicated shapes. Thus, the present invention includes such a sealing material composed of the resin composition.

The resin composition of the present invention is also useful as a material for a separator for a fuel cell because of the excellent electrical conductivity and strength. As a separator for fuel cell is a material to be required to have high electrical conductivity and strength, the resin composition of the present invention is suitably applicable thereto. The resin composition has no fear of corrosion, since it is excellent in resistance to chemicals as compared with metallic materials, and contributes to the weight reduction of a fuel cell because of the small specific gravity. Furthermore, the resin composition containing an addition type thermosetting polyimide resin as a polyimide resin has easiness in molding, and can therefore provide separators having various complicated shapes through comparatively simple steps.

Separately from the above embodiments, the electrical conductivity of the resin composition can be adjusted to the desired level by appropriately selecting the kind of the filler and the amount thereof according to the present invention. For example, a resin composition prepared by compounding appropriately from 40 to 100 parts by weight of furnace carbon black or thermal carbon black per 100 parts of the resin has an electrical conductivity comparable to that of a semiconductor. Therefore, the resin composition can be used for a material which changes resistivity depending on the temperature like an organic PTC.

EXAMPLES

The present invention will hereinafter be described more specifically. It should however be borne in mind that the present invention is not limited to or by the following examples.

Examples 1a to 7a, Comparative Examples 1a to 4a

Various resin compositions were prepared by using the below-described resins and fillers shown in Table 1 at a mixing ratio shown in Table 1.

IMI-1: "BANI-X", trade name; addition type thermosetting polyimide produced by Maruzen Petrochemical Co., Ltd. (a nadic acid type imide monomer having an allylnorbornene skeleton; having a melting point of 40° C., volume resistivity: $9.41 \times 10^{16}$ Ω·cm and specific gravity of 1.21)

IMI-2: "BANI-M", trade name; addition type thermosetting polyimide produced by Maruzen Petrochemical Co., Ltd. (a nadic acid type imide monomer having an allylnorbornene skeleton; having a melting point of 75° C., volume resistivity of $1.74 \times 10^{17}$ Ω·cm and specific gravity of 1.13)

IMI-3: "KIR-30", trade name; addition type thermosetting polyimide produced by Toshiba Chemical Corporation (a bismaleimide type polyimide prepolymer having a softening temperature of about 120° C., volume resistivity $\geq 10^{16}$ Ω·cm and specific gravity of 1.3)

PA-1: "Novamid 1012C2", trade name; polyamide 6 produced by Mitsubishi Engineering-Plastics Corporation (having volume resistivity of $1 \times 10^{15}$ Ω·cm and specific gravity of 1.14)

PA-2: "Novamid 3010N", trade name; polyamide 66 produced by Mitsubishi Engineering-Plastics Corporation (having volume resistivity of $1 \times 10^{14}$ Ω·cm and specific gravity of 1.15)

PA-3: "Grilamid TR-55", trade name; polyamide 12 produced by Mitsubishi Engineering-Plastics Corporation (having volume resistivity of $1 \times 10^{16}$ Ω·cm and specific gravity of 1.06)

PBT: "Novadur 5010", trade name; polybutylene terephthalate produced by Mitsubishi Engineering-Plastics Corporation (having volume resistivity of $1 \times 10^{16}$ Ω·cm, thermal deformation temperature of 60° C. and specific gravity of 1.31)

TPEE: "Hytrel 4047P", trade name; polyester base thermoplastic elastomer produced by DuPont-Toray Co., Ltd. (having volume resistivity of $1.8 \times 10^{12}$ Ω·cm and specific gravity of 1.15)

Each of the resin composition was prepared by adding a filler such as expanded graphite while kneading the above-described resin at a temperature not lower than the melting temperature at 30 rpm in a mill equipped with a heater.

After kneading for 15 minutes, the kneaded mass was taken out from the mill and a predetermined amount of it was filled in a mold, followed by molding by a hot press into a sheet of 100×100×2 mm. In each of Examples 1, 2 and 4 to 7, hot press is conducted under the conditions of 200°

C.×30 minutes, in Example 3 200° C.×5 minutes and in Comparative Examples, 130 to 150° C. for 2 minutes. Then, a test piece was punched out from the molded product and its bending strength (at 25±1° C.) and volume resistivity were measured in accordance with ASTM D790 and JIS K 7194, respectively.

The measurement results are shown in Table 1. In Table 1, the example number with "Com" means the number of "Comparative Example".

TABLE 1

Composition and physical properties of each sample

| | 1a | 2a | 3a | Com 1a | Com 2a | Com 3a | Com 4a | 4a | 5a | 6a | 7a |
|---|---|---|---|---|---|---|---|---|---|---|---|
| Compounded Amount (parts by weight) | | | | | | | | | | | |
| IMI-1 | 25.0 | — | — | — | — | — | — | — | — | — | — |
| IMI-2 | — | 30.0 | — | — | — | — | — | 40.0 | 40.0 | 50.0 | 66.7 |
| IMI-3 | — | — | 30.0 | — | — | — | — | — | — | — | — |
| PA-1 | — | — | — | 25.0 | — | — | — | — | — | — | — |
| PA-2 | — | — | — | — | 25.0 | — | — | — | — | — | — |
| PBT | — | — | — | — | — | 25.0 | — | — | — | — | — |
| TPEE | — | — | — | — | — | — | 25.0 | — | — | — | — |
| Expanded graphite | 75.0 | 70.0 | 70.0 | 75.0 | 75.0 | 75.0 | 75.0 | — | — | — | — |
| Granular graphite | — | — | — | — | — | — | — | 60.0 | — | — | — |
| Flaky graphite | — | — | — | — | — | — | — | — | 60.0 | — | — |
| Acetylene black | — | — | — | — | — | — | — | — | — | 50.0 | — |
| Ketjen black | — | — | — | — | — | — | — | — | — | — | 33.3 |
| P-toluene sulfonic acid | 1.0 | 0.3 | — | — | — | — | — | 0.4 | 0.4 | 0.5 | 0.7 |
| Physical Properties | | | | | | | | | | | |
| Volume Resistivity (mΩ · cm) | 3 | 4 | 4 | 70 | 80 | 120 | 47 | 16 | 14 | 55 | 150 |
| Bending Strength (kgf/cm$^2$) | 307 | 325 | 350 | 187 | 153 | 134 | 197 | 253 | 241 | 151 | 143 |

Each of the sample compositions according to the present invention containing a polyimide as a resin component exhibited high strength and high conductivity, while each of the sample compositions (Comparative Examples 1a, 2a) containing a polyamide as a resin component and sample compositions (Comparative Examples 3a, 4a) containing polybutylene terephthalate and a polyester base thermoplastic elastomer, respectively as a resin component was inferior to that according to the present invention in each of kneading properties, strength and electrical conductivity. As can be seen from Examples 4a to 7a, the sample compositions according to the present invention containing a polyimide as a resin component exhibited high strength and electrical conductivity even if other fillers were employed.

Although each of the three polyimide resins employed in Examples itself had a higher volume resistivity than any one of the resins employed in Comparative Examples, the molded product available by using the former resin had, beyond expectation, higher electrical conductivity than that using the latter resin when the content of the filler was the same.

Comparative Example 5a

Although operations were tried in a similar manner to each of Examples 1 to 3 except for the use of polycarbonate (having a volume resistivity of $4 \times 10^{16}$ Ω·cm, specific gravity of 1.20 and thermal deformation temperature of 135° C.) as a resin component, the kneaded mass overflew from the kneader in the powdery form at the time when about 200 parts by weight of expanded graphite (about 67% of the whole amount) was added, which made it impossible to continue kneading.

Comparative Example 6a

Although operations were tried in a similar manner to each of Examples 1 to 3 except for the use of polystyrene (having a volume resistivity of $1 \times 10^{18}$ Ω·cm, specific gravity of 1.06 and thermal deformation temperature of 81° C.) as a resin component, the kneaded mass overflew from the kneader in the powdery form before the charging amount of expanded graphite reached about 200 parts by weight, which made it impossible to continue kneading.

Examples 8a to 17a and Comparative Example 7a

In each of Examples 8a to 17a and Comparative Example 7a, a sample composition was prepared by powder molding technique. The raw materials shown in Table 2 were weighed, followed by kneading in a juicer mixer. The resulting powdery mixture was cured by hot pressing, whereby a sheet was obtained. Some of the sheets thus obtained were subjected to secondary crosslinking in an oven.

Molding conditions and crosslinking conditions, and physical properties of each of the sample compositions are also shown in Table 2. In the table, example number with "Com" indicates Comparative Example.

TABLE 2

Composition, Crosslinking Conditions and Physical Properties of Each Sample

| Examples | | 8a | 9a | Com 7a | 10a | 11a | 12a | 13a | 14a | 15a | 16a | 17a |
|---|---|---|---|---|---|---|---|---|---|---|---|---|
| Compounded Amount (parts by weight) | | | | | | | | | | | | |
| IMI-2 | | 30.0 | 20.0 | — | — | — | — | — | — | — | — | — |
| IMI-3 | | — | — | 80.0 | 70.0 | 30.0 | 25.0 | 20.0 | 10.0 | 30.0 | 25.0 | 25.0 |
| Expanded graphite | | 70.0 | 80.0 | 20.0 | 30.0 | 70.0 | 75.0 | 80.0 | 90.0 | 70.0 | 75.0 | 75.0 |
| p-toluene-sulfonic acid | | 0.3 | 0.2 | — | — | — | — | — | — | — | — | — |
| stearic acid | | — | — | — | — | — | — | — | — | 0.3 | — | — |
| Crosslinking Condition | | | | | | | | | | | | |
| Press Temp (° C.) | | 200 | 200 | 180 | 180 | 180 | 180 | 180 | 180 | 180 | 180 | 200 |
| Time (min) | | 30 | 30 | 30 | 30 | 30 | 30 | 30 | 30 | 30 | 30 | 5 |
| Secondary crosslinking Temp (° C.) | | — | — | — | — | — | — | — | — | 250 | 250 | 190 |
| Time (min) | | — | — | — | — | — | — | — | — | 30 | 30 | 300 |
| Physical Properties | | | | | | | | | | | | |
| Volume resistivity (mΩ · cm) | | 1.3 | 0.7 | 11.7 | 4.2 | 0.8 | 0.8 | 0.7 | 0.7 | 0.8 | 0.8 | 0.8 |
| Bending strength (kgf/cm$^2$) | 25 ± 1° C. | 386 | 375 | 200 | 302 | 537 | 525 | 574 | 422 | 541 | 530 | 529 |
| | 100° C. | 324 | 335 | 187 | 220 | 342 | 429 | 376 | 327 | 435 | 485 | 434 |

It has been found that the resin compositions containing predetermined amounts of a polyimide resin and a filler according to the present invention exhibit high strength and high electrical conductivity.

On the other hand, the resin composition containing a polyamide resin and a filler in amounts outside the range of the present invention (Comparative Example 7a) was found to be inferior to those of Examples 10a to 16a in both strength and electrical conductivity.

Examples 1b to 5b, Comparative Examples 1b to 6b

Preparation of Sample Compositions

Various resin compositions were prepared using the below-described resins and fillers shown in Table 3 at a weight ratio shown in Table 3.

EPX-1: "Epikote 828", trade name; bisphenol A type epoxy resin precursor produced by Yuka Shell Epoxy Kabushiki Kaisha (having an epoxy equivalent of 184 to 194 and being in the liquid form at normal temperature)

EH-1: "Epicure YH-308H", trade name; acid-anhydride-type epoxy curing agent produced by Yuka Shell Epoxy Kabushiki Kaisha (having a neutralization equivalent of about 91 and a melting point of about 85° C.)

IMI-2: "BANI-M", trade name; addition type thermosetting polyimide produced by Maruzen Petrochemical Co., Ltd. (a nadic acid type imide monomer having an allylnor-bornene skeleton; having a melting point of 75° C., volume resistivity of $1.74 \times 10^{17}$ Ω·cm and specific gravity of 1.13)

Each of the resin compositions was prepared by adding a filler such as expanded graphite while kneading the above-described resin at a temperature not lower than the melting temperature at 30 rpm in a mill equipped with a heater. After kneading for 15 minutes, the kneaded mass was taken out from the mill and a predetermined amount of it was filled in a mold, followed by molding by a hot press into a-sheet of 100×100×2 mm. At that time, easiness of the filler charging work and conditions (existence of swelling, trace of the flow, surface peeling or the like) of the sheet after pressing were evaluated and they were used as an index for easiness of preparation of the sample composition (the rank A in Table 3 indicates that the filler can be added easily or the conditions of the sheet are good, while the rank C indicates contrary results). In each of Examples 1b to 5b and Comparative Examples 1b and 2b, hot press was conducted under the conditions of 200° C.×30 minutes, while in each of Comparative Examples 3b to 6b under the conditions of 130 to 150° C. for 2 minutes. Then, a test piece was punched out from the molded product and its bending strength (at 25±1° C.) and volume resistivity were measured in accordance with ASTM D790 and JIS K 7194, respectively.

The measurement results are shown in Table 3. In Table 3, the example number with "Com" means "Comparative Example". However, the resin composition of Com 2b is the first resin composition according to the present invention.

TABLE 3

Composition and physical properties of each sample

| | Com 1b | 1b | 2b | 3b | 4b | Com 2b | Com 3b | Com 4b | Com 5b | Com 6b | 5b |
|---|---|---|---|---|---|---|---|---|---|---|---|
| Compounded Amount (parts by weight) | | | | | | | | | | | |
| EPX-1 | 13.9 | 11.1 | 8.3 | 5.6 | 2.8 | — | — | — | — | — | 11.1 |
| EH-1 | 11.1 | 8.9 | 6.7 | 4.4 | 2.2 | — | — | — | — | — | 8.9 |
| IMI-2 | — | 5.0 | 10.0 | 15.0 | 20.0 | 25.0 | — | — | — | — | 20.0 |
| PA-1 | — | — | — | — | — | — | 25.0 | — | — | — | — |
| PA-2 | — | — | — | — | — | — | — | 25.0 | — | — | — |
| PBT | — | — | — | — | — | — | — | — | 25.0 | — | — |
| TPEE | — | — | — | — | — | — | — | — | — | 25.0 | — |
| Expanded graphite | 75.0 | 75.0 | 75.0 | 75.0 | 75.0 | 75.0 | 75.0 | 75.0 | 75.0 | 75.0 | 50.0 |
| Ketjen black | — | — | — | — | — | — | — | — | — | — | 10.0 |
| P-toluene-sulfonic acid | 0.25 | 0.25 | 0.25 | 0.25 | 0.25 | 0.25 | — | — | — | — | 0.25 |
| Preparation | | | | | | | | | | | |
| Filler kneading | A | A | A | A | A | B | C | C | C | B | B |
| Conditions of sheet | B | A | A | A | A | B | B | C | A | B | A |
| Physical Properties | | | | | | | | | | | |
| Volume resistivity (mΩ·cm) | 2.4 | 2.3 | 2.4 | 2.2 | 2.0 | 2.1 | 70 | 80 | 120 | 47 | 6.8 |
| Bending strength (kgf/cm²) | 231 | 248 | 269 | 247 | 211 | 191 | 187 | 153 | 134 | 197 | 203 |

Note) Curing conditions in Examples 1b to 5b and Comparative Examples 1b and 2b: 200° C.×30 minutes In FIG. 1, shown is a graph in which the results of the bending test in Examples 1b to 4b and Comparative Examples 1b and 2b are plotted versus the weight percentage of the polyimide in the resin composition. In the graph, a dotted line indicates the plot in the case where the bending strength and the ratio (epoxy:polyimide) have a relationship represented by a primary function (in other words, additivity).

It is apparent that the sample compositions according to the-present invention each containing both an epoxy resin and a polyimide resin had improved bending strength while maintaining high electrical conductivity, compared with those composed of only one of these resins as a base. In addition, the filler could be filled easily and the conditions of the sheet obtained by molding were good, which suggests that the preparation and molding of these resin compositions can be conducted easily.

Although the volume resistivity of each of the raw material polyimide resins themselves employed in Examples was higher than that any one of PA-1, PA-2, PBT and PTEE employed in Comparative Examples, and the volume resistivity of the cured epoxy product was not so low, $10^{11}$ to $10^{14}$ Ω·cm, the molded product was found to have, beyond expectation, good electrical conductivity.

As can be seen from Example 5b, the sample composition according to the present invention exhibited high strength and electrical conductivity even when other fillers were employed.

Examples 6b to 12b and Comparative Examples 7b and 8b

Sample compositions were prepared by the powder molding technique. The raw materials shown in Table 4 were weighed and then kneaded in a juicer mixer. The abbreviations in Table 4 indicate the following materials:

EPX-2: "F-6136", powdery epoxy resin produced by Somar Corporation (a mixture of bisphenol A novolak type epoxy resin precursor and a dicyandiamide curing agent)

IMI-3: "KIR-30", trade name; addition type thermosetting polyimide produced by Toshiba Chemical Corporation (a bismaleimide type polyimide prepolymer having a softening temperature of about 120° C., volume resistivity $\geq 10^{16}$ Ω·cm and specific gravity of 1.3)

The powdery mixture thus obtained was cured at 200° C.×5 minutes by a hot press, followed by secondary crosslinking at 190° C. for 5 hours in an oven. The conditions and physical properties of the sheet are shown in Table 4. Incidentally, the example number with "Com" means "Comparative Example". However, the resin composition of Com 8b is the first resin composition according to the present invention.

TABLE 4

Composition and physical properties of each sample

| Example No. | | Com 7b | 6b | 7b | 8b | 9b | 10b | 11b | 12b | Com 8b |
|---|---|---|---|---|---|---|---|---|---|---|
| Compounded Amount (parts by weight) | | | | | | | | | | |
| EPX-2 | | 25.0 | 22.5 | 21.25 | 20.0 | 17.5 | 15.0 | 10.0 | 5.0 | — |
| IMI-3 | | — | 2.5 | 3.75 | 5.0 | 7.5 | 10.0 | 15.0 | 20.0 | 25.0 |
| Expanded graphite | | 75.0 | 75.0 | 75.0 | 75.0 | 75.0 | 75.0 | 75.0 | 75.0 | 75.0 |
| Condition of Sheet | | | | | | | | | | |
| Swelling (number) | | 5–6 | 2–3 | 1–2 | 0 | 0 | 0 | 0 | 0 | 5–6 |
| Peeling | | Peeled | Slightly peeled | Not peeled | Not peeled | Not peeled | Not peeled | Not peeled | Not peeled | Slightly peeled |
| Physical Properties | | | | | | | | | | |
| Volume resistivity (mΩ · cm) | | 0.9 | 0.9 | 1.1 | 1.0 | 1.0 | 0.9 | 0.8 | 0.9 | 0.9 |
| Bending strength (kgf/cm$^2$) | 25 ± 1° C. | 485 | 475 | 457 | 499 | 523 | 627 | 584 | 532 | 507 |
| | 100° C. | 324 | 351 | 395 | 491 | 466 | 429 | 433 | 406 | 412 |

Curing conditions: 200° C.×5 min.+190° C. for 5 hrs

Figure 2:
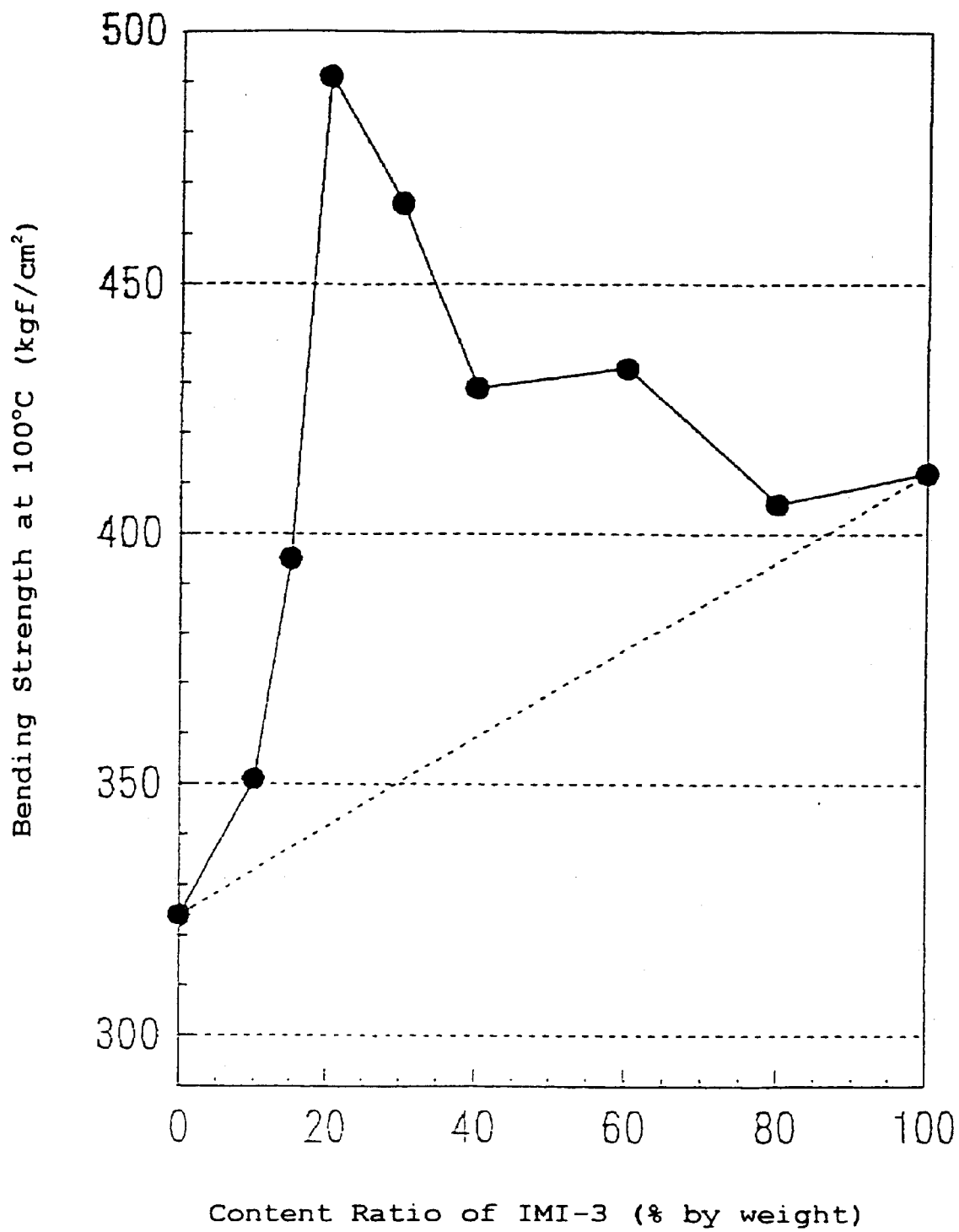
FIG. 2 is a graph in which results of the bending test (at 100° C.) in Examples 6b to 12b and Comparative Examples 7b and 8b are plotted along the weight percentage of the polyimide resin in the resin composition.

In FIG. 2 shown is a graph in which the results of the bending test at 100° C. in Examples 6b to 12b and Comparative Examples 7b and 8b are plotted versus the weight percentage of polyimide in the resin component. In the graph, a dotted line indicates the plot in the case where the bending strength and the ratio (epoxy:polyimide) have a relationship represented by a primary function (in other words, additivity).

It is apparent that the sample compositions according to the present invention each containing both an epoxy resin and a polyimide resin had improved bending strength while maintaining high electrical conductivity, compared with those composed of only one of these resins as a base. In addition, swelling or peeling was not observed so much from the sheet, which suggests that molding of the resulting resin compositions can be carried out easily.

Examples 13b to 15b and Comparative Examples 9b to 14b

In a similar manner to each of Examples 6b to 12b, operations were carried out using the below-described epoxy resin and curing agent and IMI-1 or 2. The secondary crosslinking was however not carried out.

EPX-3: "Epikote 1004", trade name; bisphenol A type epoxy resin precursor produced by Yuka Shell Epoxy Kabushiki Kaisha (having an epoxy equivalent of 875 to 975 and a softening point of 97° C.)

EPX-4: "F-6976", trade name; powdery epoxy resin produced by Somar Corporation (a mixture of bisphenol A novolak type epoxy resin precursor, acid anhydride and phenol base curing agent)

EX-2: "Epicure EMI24", trade name; imidazole type epoxy curing agent produced by Yuka Shell Epoxy Kabushiki Kaisha (2-ethyl-4(5)-methylimidazole)

In each of Example 15b and Comparative Example 9b, the resin was dissolved in THF (tetrahydrofuran) in advance and graphite was immersed in the resulting solution. After drying THF, the resulting mixture was cured and molded by pressing.

Composition, curing conditions and test results of physical properties are shown in Table 5. In Table 3, the example number with "Com" means "Comparative Example". However, the resin compositions of Com 10b, 12b and 14b are the first resin compositions according to the present invention.

TABLE 5

Composition and physical properties of each sample

| Example No. | Com 9b | 13b | Com 10b | Com 11b | 14b | Com 12b | Com 13b | 15b | Com 14b |
|---|---|---|---|---|---|---|---|---|---|
| Compounded Amount (parts by weight) | | | | | | | | | |
| EPX-3 | 21.6 | 17.3 | — | — | — | — | — | — | — |
| EPX-4 | — | — | — | 25.0 | 20.0 | — | — | — | — |
| EPX-1 | — | — | — | — | — | — | 25.0 | 12.5 | — |
| EH-1 | 3.4 | 2.7 | — | — | — | — | — | — | — |
| EH-2 | — | — | — | — | — | — | 1.0 | 0.5 | — |
| IMI-2 | — | 5.0 | 25.0 | — | — | — | — | — | — |
| IMI-3 | — | — | — | — | 5.0 | 25.0 | — | 12.5 | 25.0 |
| Expanded graphite | 75.0 | 75.0 | 75.0 | 75.0 | 75.0 | 75.0 | 75.0 | 75.0 | 75.0 |
| p-toluene- | | | | | | | | | |

TABLE 5-continued

Composition and physical properties of each sample

| Example No. | | Com 9b | 13b | Com 10b | Com 11b | 14b | Com 12b | Com 13b | 15b | Com 14b |
|---|---|---|---|---|---|---|---|---|---|---|
| sulfonic acid | | — | 0.05 | 0.25 | — | — | — | — | — | 0.25 |
| Curing | | | | | | | | | | |
| Press curing | Temp (° C.) | 200 | 200 | 200 | 200 | 200 | 200 | 190 | 190 | 190 |
| | Time (min) | 30 | 30 | 30 | 5 | 5 | 5 | 10 | 10 | 10 |
| Physical Properties | | | | | | | | | | |
| Volume resistivity (mΩ · cm) | | 1.2 | 1.2 | 0.9 | 1.5 | 1.0 | 0.8 | 0.8 | 0.9 | 1.2 |
| Bending strength (kgf/cm$^2$) | 25 ± 1° C. | 323 | 359 | 347 | 397 | 543 | 529 | 182 | 332 | 325 |
| | 100° C. | — | — | — | 192 | 324 | 412 | — | — | — |

It has been understood that the resin compositions containing both resins according to the present invention exhibit high bending strength, while maintaining good electrical conductivity even if the natures of the epoxy resin, curing agent and polyimide resin are changed.

While the invention has been described in detail and with reference to specific embodiments thereof, it will be apparent to one skilled in the art that various changes and modifications can be made herein without departing from the spirit and scope thereof.

What is claimed is:

1. A fuel cell separator, which comprises a resin composition consisting essentially of (A) 100 parts by weight of a resin composed of 5 to 99 parts by weight of an epoxy resin and 95 to 1 part by weight of a polyimide resin, wherein the resin component provides a bending strength in excess of that provided by the polyimide resin or the epoxy resin used individually, with the proviso that the total amount of the epoxy resin and the polyimide resin is 100 parts by weight, and (B) 40 to 900 parts by weight of at least one filler selected from the group consisting of graphite, kektjen black, acetylene black, furnace carbon black and thermal carbon black.

2. A fuel cell separator, which comprises a resin composition consisting essentially of (A) 100 parts by weight of a resin composed of 5 to 99 parts by weight of an epoxy resin and 95 to 1 part by weight of a polyimide resin, wherein the resin component provides a bending strength in excess of that provided by the polyimide resin or the epoxy resin used individually, with the proviso that the total amount of the epoxy resin and the polyimide resin is 100 parts by weight, and (B) 40 to 900 parts by weight, sufficient to produce a bulk resistivity of not more than 50 Ω-cm, of at least one filler selected from the group consisting of graphite, kektjen black, acetylene black, furnace carbon black and thermal carbon black.

3. A fuel cell separator, according to claim 2, wherein the filler is present in an amount sufficient to produce a bulk resistivity of not more than 3 m Ω-cm.

* * * * *